United States Patent [19]

Titterton, III

[11] Patent Number: 4,824,327
[45] Date of Patent: Apr. 25, 1989

[54] GAS TURBINE ENGINE OIL DRAIN SLOT
[75] Inventor: George F. Titterton, III, Jupiter, Fla.
[73] Assignee: United Technologies Corporation, Hartford, Conn.
[21] Appl. No.: 133,473
[22] Filed: Dec. 15, 1987
[51] Int. Cl.⁴ .................. B64C 11/30; F01D 25/18
[52] U.S. Cl. ......................... 416/174; 416/146 A
[58] Field of Search ............... 416/146 A, 174 A; 415/175; 184/6.11; 60/39.08

[56] References Cited

U.S. PATENT DOCUMENTS

| | | | |
|---|---|---|---|
| 2,827,342 | 3/1958 | Roach | 308/122 |
| 3,528,241 | 9/1970 | Venable et al. | 184/6.11 X |
| 3,647,313 | 3/1972 | Koff | 184/6.11 X |
| 3,844,110 | 10/1974 | Widlansky et al. | 60/39.08 |
| 3,903,690 | 9/1975 | Jones | 60/39.08 |
| 3,912,418 | 10/1975 | Andrews et al. | 416/174 |
| 3,935,704 | 2/1976 | Barnes | 60/39.08 |
| 4,190,398 | 2/1980 | Corsmeier et al. | 60/39.08 |
| 4,230,436 | 10/1980 | Davison | 415/175 |
| 4,309,145 | 1/1982 | Viola | 415/180 X |
| 4,469,470 | 9/1984 | Geary | 60/39.75 X |
| 4,500,143 | 2/1985 | Kervistin et al. | 384/467 |
| 4,693,672 | 9/1987 | Carvalho | 416/174 |

FOREIGN PATENT DOCUMENTS 2844701 4/1979 Fed. Rep. of Germany ........ 416/95

Primary Examiner—Everette A. Powell, Jr.
Attorney, Agent, or Firm—Edward L. Kochey, Jr.

[57] ABSTRACT

A spillage oil drain from the volume between a conical hub and a disk is comprised of a radial slot in the edge of the hub flange where it abuts the disk.

2 Claims, 1 Drawing Sheet

GAS TURBINE ENGINE OIL DRAIN SLOT

The Government has rights in this invention pursuant to a contact awarded by the Department of the Navy.

DESCRIPTION

TECHNICAL FIELD

The invention relates to gas turbine engines and in particular to an arrangement for draining leakage oil from the rotor interior.

BACKGROUND OF THE INVENTION

Gas turbine engines require substantial amounts of high pressure lubricating oil to the rotor bearings. During some transient operations and in particular during start-up clearances exist which permit leakage of the oil into the interior of the rotor assembly.

Oil remaining trapped within the rotor may cause unbalance which leads to destructive vibration. Many parts of the rotor have radially outward flow paths into the air or gas flow path. Oil in these zones will easily be thrown out.

A structural conical hub often connects the last disk of an assembly to a small diameter shaft portion. This hub is highly loaded with dynamic torque radial and axial loads. With the high loading of both the disk and the hub, solid impervious structures are used. Leakage oil becomes trapped between the hub and the disk unless some provision is made for drainage.

Prior art systems have placed a small drainage hole through the hub at a location near the connection to the disk. Presence of this hole in the highly stressed area decreases the low cycle fatigue life of the hub, even with conventional fabrication techniques such as rounding of edges, etc., used to decrease stress concentrations. Also scratching or nicking of the surface during fabrication or maintenance work can introduce local stress raisers.

In addition to the general high loading on the hub, local bending is introduced at the attachment to the disk. Attempts to locate the drainage hole close to the disk therefore increases the stress level. On the other hand attempts to locate the hole away from the disk lead to an undrained pocket radially outward of the hole location.

SUMMARY OF THE INVENTION

An impervious conical hub connects a bladed disk to a small diameter shaft whereby leakage oil is trapped between the disk and the hub. The hub has a radially extending flange abutting and bolted to the disk. A slot in the innerface of the flange provides an oil drainage path between the hub and the disk at the outermost location. The surface discontinuity caused by the slot is out of the high stress area, and is oriented to be a relatively low stress raiser.

DESCRIPTION OF THE PREFERRED EMBODIMENT

Figure 1:
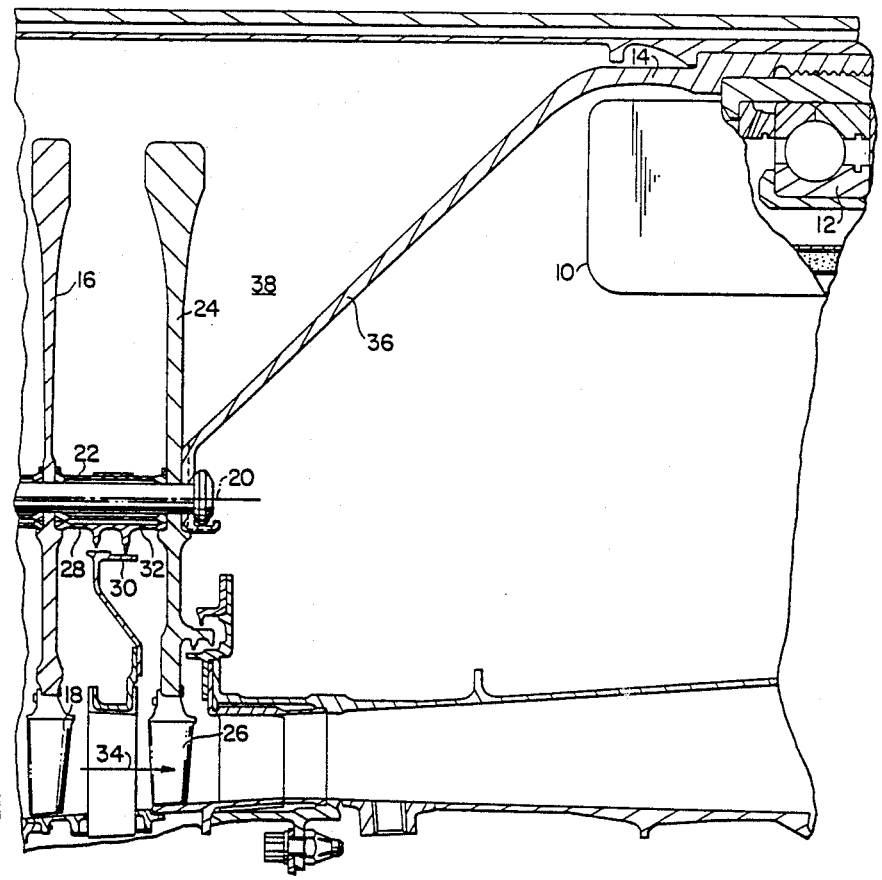
FIG. 1 is a section of a gas turbine engine in the area of the conical hub.

An oil bearing compartment 10 encloses a bearing 12 which supports a small diameter portion 14 of the shaft rotor.

An intermediate disk 16 carrying blades 18 is bolted with bolts 20 and spacers 22 with other disks including the last stage disk 24. This disk also carries blades 26 located in the air and gas flow path.

A cylindrical labyrinth seal 28 located between these two disks seals against abrasion seal 30 and has a plurality of oil drain holes 32 therein. Any oil which should be trapped between disks 16 and 24 is thereby thrown out through hole 32 passing into the air or gas flow path 34.

An impervious conical hub 36 connects the small diameter shaft portion 14 to disk 24 at a second large diameter. This hub is also secured with bolts 20. This hub is axially loaded with load passing from the engine section illustrated along the small diameter shaft to another gas turbine engine section. It also carries substantial radial and torque loads.

During start-up when clearances may be greater than designed clearances leakage oil may find its way into chamber 38, thereby becoming trapped between disk 24 and conical hub 36.

Figure 2:
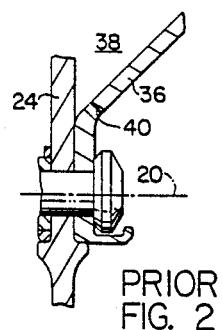
FIG. 2 is a prior art drain hole.

FIG. 2 illustrates a prior art arrangement wherein one or more drain holes 40 are placed through the hub at a location near its attachment to the disk. It is found that because of the stress concentration caused by these holes the fatigue life of the hub is limited. These holes furthermore cannot be placed further to the edge of chamber 38 without further decreasing the fatigue life.

Figure 3:
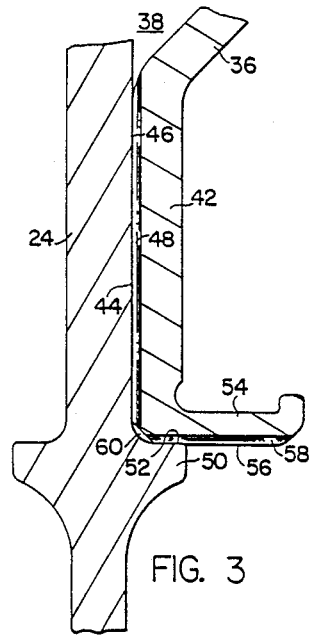
FIG. 3 is an expanded detail of the slot drain.

Referring to FIG. 3 the hub 36 has a radially outwardly extending flange 42 with an abutment surface 44 parallel to and in contact with surface 46 of disk 24. A radial groove 48 extends through the radial extent of the abutment surface for drainage of oil from the interior 38 of the conical hub.

The disk 24 also has a shoulder 50 with an axially extending shoulder surface 52. The flange 42 has an axially extending reinforcement section 54 with a surface 56 abutting surface 52 of the disk. An axially extending slot 58 is arranged for oil drainage and is fluidly connected to slot 58 with a chamfered slot 60. This slot is locally deepened by the chamfer in the area of the bend to minimize the possibility of pluggage by elongated dirt particles passing through the drain hole.

As compared to the holes of the prior art the elongated slot of this invention is removed from the high stress area and is oriented in a direction to minimize the effect of stress concentrations.

While the drainage opening is required for the purpose of discharging trapped oil, the opening is to some extent detrimental to normal operation since air flow passes in the reverse direction through this slot. If the opening were sized only for the very slight flow of oil required, it would be extremely small. It actually must be larger than this to avoid pluggage by dirt particles. This of course increases the amount of reverse flow which must be tolerated. The use of an elongated slot having friction in addition to the entrance and exit losses of the fluid flow provides a means for restricting the overall flow through this opening at any time while still using a relatively large flow path area.

I claim:

1. An apparatus for draining spillage oil from the rotor of a gas turbine engine comprising:

a disk carrying blades;

a shaft portion of a rotor having a first small radius;

a bearing supporting said shaft portion;

an impervious conical hub connecting said shaft portion at said first radius and said disk at a second large radius;

an outwardly radially extending flange integral with said conical hub at said second radius having an abutment surface parallel to and abutting said disk;

a substantially radial groove through the radial extent of said abutment surface for drainage of oil from the interior of said conical hub.

2. An apparatus as in claim 1:

said flange having at its radially outside edge an axially extending reinforcement section;

said disk having an axially extending circumferential shoulder;

said shoulder and said reinforcement section being in radially abutting relationship; and an axial groove in said reinforcement section in fluid communication with said radial groove.

* * * * *